US012566703B2

(12) United States Patent
Garg et al.

(10) Patent No.: US 12,566,703 B2
(45) Date of Patent: Mar. 3, 2026

(54) REMOTE ACCESS SOLUTION FOR COMPUTE EXPRESS LINK (CXL) MEMORY INTERFACE CONFIGURED TO SEND INFORMATION REGARDING A CAPACITY, A LATENCY, OR BANDWIDTH OF MEMORY VIA INTERFACE

(71) Applicant: Samsung Electronics Co., Ltd., Suwon-si (KR)

(72) Inventors: Mukesh Garg, Stanford, CA (US); Ramzi Ammari, Santa Clara, CA (US); Praveen Krishnamoorthy, Fremont, CA (US); Changho Choi, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/054,492

(22) Filed: Nov. 10, 2022

(65) Prior Publication Data

US 2024/0095171 A1     Mar. 21, 2024

Related U.S. Application Data

(60) Provisional application No. 63/408,725, filed on Sep. 21, 2022.

(51) Int. Cl.
*G06F 12/0815* (2016.01)
*G06F 13/28* (2006.01)

(52) U.S. Cl.
CPC .......... *G06F 12/0815* (2013.01); *G06F 13/28* (2013.01); *G06F 2213/28* (2013.01)

(58) Field of Classification Search
CPC ... G06F 12/0815; G06F 13/28; G06F 2213/28
See application file for complete search history.

(56) References Cited

U.S. PATENT DOCUMENTS 7,594,081 B2     9/2009  Bouchard et al.
9,940,287 B2     4/2018  Das Sharma
(Continued)

FOREIGN PATENT DOCUMENTS

CN        114675722 A     6/2022
CN        114968895 A     8/2022
(Continued)

OTHER PUBLICATIONS

Gurumurthi, Sudhanva, et al., "An Overview of Reliability, Availability, and Serviceability (RAS) in Compute Express Link(TM) 2.0," Compute Express Link, Jan. 30, 2021, XP093169375, 18 pages, Internet: URL:https://Avww.academia.edu/45413748/Compute_Express_Link_RAS?email_work_card=thumbnail (Year: 2021).*
(Continued)

*Primary Examiner* — Tammara R Peyton
(74) *Attorney, Agent, or Firm* — Womble Bond Dickinson (US) LLP

(57) ABSTRACT

A system with an interface for remote memory. In some embodiments, the system includes: an interface circuit having: a first interface, configured to be connected to a processing circuit; and a second interface, configured to be connected to memory, the first interface including a cache coherent interface, and the second interface being different from the first interface.

20 Claims, 8 Drawing Sheets

(56) References Cited

U.S. PATENT DOCUMENTS

| | | | | |
|---|---|---|---|---|
| 10,585,819 | B2 * | 3/2020 | Kachare | G06F 13/1668 |
| 10,915,445 | B2 | 2/2021 | Gandhi et al. | |
| | | | m | |
| 11,461,234 | B2 * | 10/2022 | Palfer-Sollier | G06F 12/0833 |
| 11,841,814 | B2 * | 12/2023 | Malladi | G06F 15/17331 |
| 12,056,066 | B2 * | 8/2024 | Lee | G06F 13/1668 |
| | | | | |
| 2020/0327084 | A1 | 10/2020 | Choudhary et al. | |
| 2020/0327088 | A1 | 10/2020 | Choudhary et al. | |
| 2021/0311646 | A1 | 10/2021 | Malladi et al. | |
| 2021/0311739 | A1 | 10/2021 | Malladi et al. | |
| | | | | |
| 2021/0311895 | A1 | 10/2021 | Das Sharma | |
| 2021/0373951 | A1 | 12/2021 | Malladi et al. | |
| 2022/0113915 | A1 | 4/2022 | Ki et al. | |
| 2022/0114099 | A1 | 4/2022 | Blankenship et al. | |
| 2022/0147476 | A1 | 5/2022 | Nam et al. | |

FOREIGN PATENT DOCUMENTS

| | | |
|---|---|---|
| EP | 3552108 B1 | 8/2021 |
| EP | 3974998 A2 | 3/2022 |

OTHER PUBLICATIONS

Debrendra Das Sharma et al., "Compute Express Link (tm) 2.0 White Paper" Nov. 2020, CXL, pp. 1-4 (Year: 2020).*

Pinto, C. et al., "ThymesisFlow: A Software-Defined, HW/SW co-Designed Interconnect Stack for Rack-Scale Memory Disaggregation", 2020 53rd Annual IEEE/ACM International Symposium on Microarchitecture (MICRO), 2020, pp. 868-880, IEEE.

Shantharama, P. et al., "Hardware-Accelerated Platforms and Infrastructures for Network Functions: A Survey of Enabling Technologies and Research Studies", IEEE Access, Jul. 9, 2020, vol. 8, pp. 132021-132085, IEEE.

EPO Extended European Search Report dated Feb. 26, 2024, issued in corresponding European Patent Application No. 23164986.4 (9 pages).

* cited by examiner

Execute a store instruction
505

In response to the executing of the store instructions, send a store command to a memory comprising the first memory location
510

Execute a load instruction
515

In response to the executing of the load instructions, send a read command to a memory comprising the second memory location
520

REMOTE ACCESS SOLUTION FOR COMPUTE EXPRESS LINK (CXL) MEMORY INTERFACE CONFIGURED TO SEND INFORMATION REGARDING A CAPACITY, A LATENCY, OR BANDWIDTH OF MEMORY VIA INTERFACE

CROSS-REFERENCE TO RELATED APPLICATION(S)

The present application claims priority to and the benefit of U.S. Provisional Application No. 63/408,725, filed Sep. 21, 2022, entitled "REMOTE ACCESS SOLUTION FOR CXL MEMORY CLUSTERING ACROSS SERVERS", the entire content of which is incorporated herein by reference.

FIELD

One or more aspects of embodiments according to the present disclosure relate to computing systems, and more particularly to an interface for remote memory.

BACKGROUND

In a computing system, a host central processing unit (CPU) may be connected to host memory through, for example, an address bus and a data bus, or by using high speed interconnect like CXL. Some systems for forming connections to memory may limit the lengths of conductors (e.g., cables) that may be used to form the connections.

It is with respect to this general technical environment that aspects of the present disclosure are related.

SUMMARY

According to an embodiment of the present disclosure, there is provided a system, including: an interface circuit having: a first interface, configured to be connected to a processing circuit; and a second interface, configured to be connected to memory, the first interface including a cache coherent interface, and the second interface being different from the first interface.

In some embodiments, the system further includes a memory server connected to the second interface.

In some embodiments, the second interface includes a remote direct memory access interface.

In some embodiments, the second interface includes a computer cluster interconnect interface.

In some embodiments, the computer cluster interconnect interface includes an Ethernet interface.

In some embodiments, the memory server is connected to the second interface by a cable having a length greater than 6 feet.

In some embodiments, the cache coherent interface includes a Compute Express Link (CXL) interface.

In some embodiments, the first interface is configured to: send data to the processing circuit in response to a load instruction executed by the processing circuit; and receive data from the processing circuit in response to a store instruction executed by the processing circuit.

In some embodiments, the system further includes a Compute Express Link (CXL) root complex connected between the processing circuit and the first interface.

According to an embodiment of the present disclosure, there is provided a system, including: an interface circuit having: a first interface, configured to be connected to a processing circuit; and a second interface, configured to be connected to memory, the first interface including a Compute Express Link (CXL) interface, and the second interface being different from the first interface.

In some embodiments, the system further includes a memory server connected to the second interface.

In some embodiments, the second interface includes a remote direct memory access interface.

In some embodiments, the second interface includes a computer cluster interconnect interface.

In some embodiments, the computer cluster interconnect interface includes an Ethernet interface.

In some embodiments, the memory server is connected to the second interface by a cable having a length greater than 6 feet.

In some embodiments, the CXL interface includes a cache coherent interface.

In some embodiments, the first interface is configured to: send data to the processing circuit in response to a load instruction executed by the processing circuit; and receive data from the processing circuit in response to a store instruction executed by the processing circuit.

In some embodiments, the system further includes a CXL root complex connected between the processing circuit and the first interface.

According to an embodiment of the present disclosure, there is provided a method, including: executing, by a central processing unit, a store instruction for storing a first value in a first memory location at a first address, in response to the executing of the store instruction, sending a store command, by an interface circuit, to a memory including the first memory location, the store command being a command to store the first value in the first memory location, wherein the interface circuit has: a first interface, connected to the central processing unit; and a second interface, connected to the memory, the first interface including a Compute Express Link (CXL) interface, and the second interface being different from the first interface.

In some embodiments, the method further includes: executing, by the central processing unit, a load instruction for loading, into a register of the central processing unit, a value in a second memory location at a second address, in response to the executing of the load instruction, sending a read command, by the interface circuit, to the memory, the read command being a command to read the value in the second memory location.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
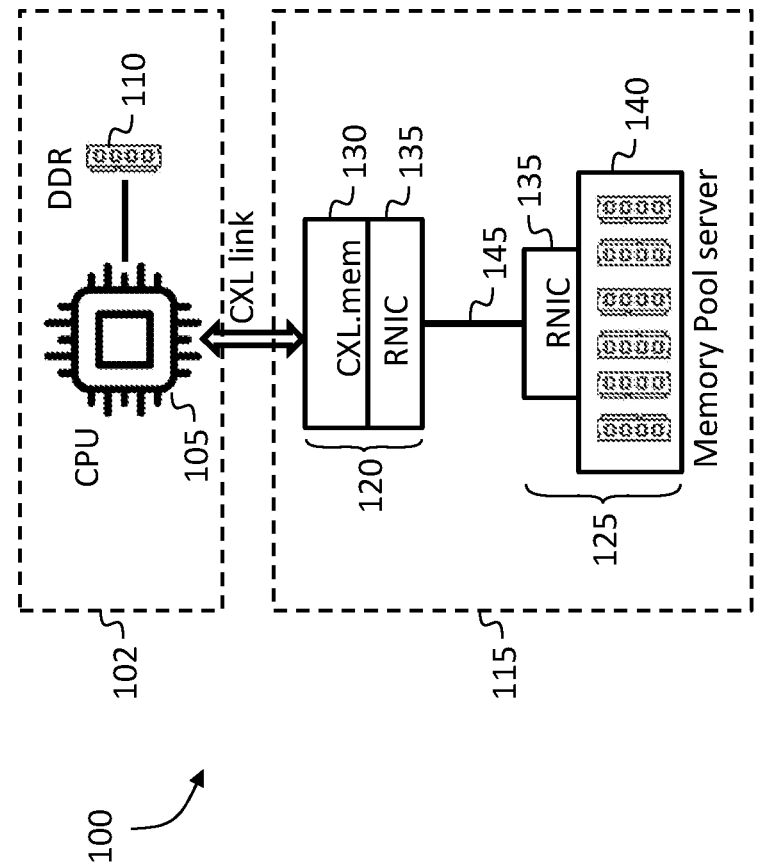
FIG. 1A is a block diagram of a single-host computing system, according to an embodiment of the present disclosure.

The detailed description set forth below in connection with the appended drawings is intended as a description of exemplary embodiments of an interface for remote memory provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In various computing applications, a host may have requirements for memory that vary with time, e.g., as new applications start on the host, as currently running applications are shut down, or as the demands made on an application by users vary. Equipping the host with sufficient main memory to handle the highest foreseeable demands may be costly, however. Moreover, cable length limitations that may be present for some interfaces between a host central processing unit (CPU) and memory may limit the volume available for memory (e.g., to the volume available within the same rack as the host CPU).

As such, some embodiments create a mechanism to allow a host application to access a memory pool outside the local rack level using normal load and store commands. Such embodiments may use a cache coherent interface (e.g., a Compute Express Link (CXL) interface) to an interface circuit, which may operate as a front end of the memory pool, with a low latency remote memory access protocol (e.g., RDMA) memory pool operating as the back end of the memory pool. The system may dynamically allocate resources through the interface circuit and a shared memory pool. Such embodiments may achieve memory disaggregation to physically separated memory resources (e.g., resources which need not be in the same rack as the processing circuit using the resources), avoiding limitations of some memory interface links (e.g., links, such as CXL, based on Peripheral Component Interconnect Express (PCIe), which may have a cable length limited to, e.g., a length of between 8 inches (PCIe Gen 3) and 15 inches (PCIe Gen 1)).

In some embodiments, a host may access the pool of memory using load and store semantics, and avoid the need to implement physical resources (such as dynamic random access memory (DRAM)) on a device that is within the same rack as the host. Disaggregated memories (over a low latency remote memory access protocol (e.g., RDMA)) may be used to allocate resources at run time. In some embodiments, the interface circuit may be re-configured to any size and mapped to the remote memory pool, and the remote memory pool may provide a fluid set of memory resources that may be dynamically combined to meet the needs of the server in a composable disaggregated memory architecture. Some embodiments result in a lower total cost of ownership (TCO) and overcome cable length limitations present in some interfaces by supporting long distance memory disaggregation over RDMA (which may be compatible with a cable having a length greater than, e.g., 6 feet).

Referring to FIG. 1A, in some embodiments, a computing system 100 includes a host 102 (including a central processing unit (CPU) 105 (which may be or include a processing circuit) and a local memory 110 (which may be a double data rate (DDR) memory)) and a memory system 115. The memory system may include an interface circuit 120 which includes front-end interface 130 with cache coherent memory access protocol (e.g., cxl.mem) and a back-end interface 135 with a low latency remote memory access capability (e.g., an RDMA enabled network interface card). The front-end interface 130 may be a CXL interface (e.g., CXL.mem); in this case the interface circuit 120 may be referred to as a CXL device. The memory pool server 125 may include a back-end interface 135 and a memory pool 140. The memory pool 140 may include, e.g., banks of dynamic random access memory, e.g., configured as memory modules, each memory module including a plurality of memory chips on a printed circuit board. The memory may be connected directly to the back-end interface 135 of the memory pool server 125, or some or all of the memory may be implemented in one or more memory servers, connected to the memory pool server 125 through a computer cluster interconnect interface.

The front-end interface 130 may be connected to the address bus and to the data bus of the CPU 105. As such, from the perspective of the CPU 105, the storage provided by the memory system 115 may be substantially the same as the local memory 110, and, in operation, the memory system 115 may respond directly to load and store instructions executed by the CPU 105 when the address of such an instruction is within a range of physical addresses allocated to the interface circuit 120. This capability, of the memory system 115 to respond directly to load and store instructions executed by the CPU 105, may make it unnecessary for the CPU to call a driver function to store data in the memory system 115 or to retrieve data from the memory system 115.

The host 102 may see the interface circuit 120 as a CXL device, which advertises its memory resources to the host 102 through CXL discovery. For example, suitable values stored in the Base Address Registers (BARs) in the CXL interface of the interface circuit 120 may determine the size of the range of memory addresses allocated to the interface circuit 120. At startup, to determine the size of the memory available through the interface circuit 120, the CPU may write a word of all binary ones to the appropriate Base Address Register and then read the same Base Address Register; in response, the interface circuit 120 may send a word indicating the size of the available memory region. The host 102 may use the memory resource by executing load or store instructions of the instruction set of the CPU 105.

Figure 1B:
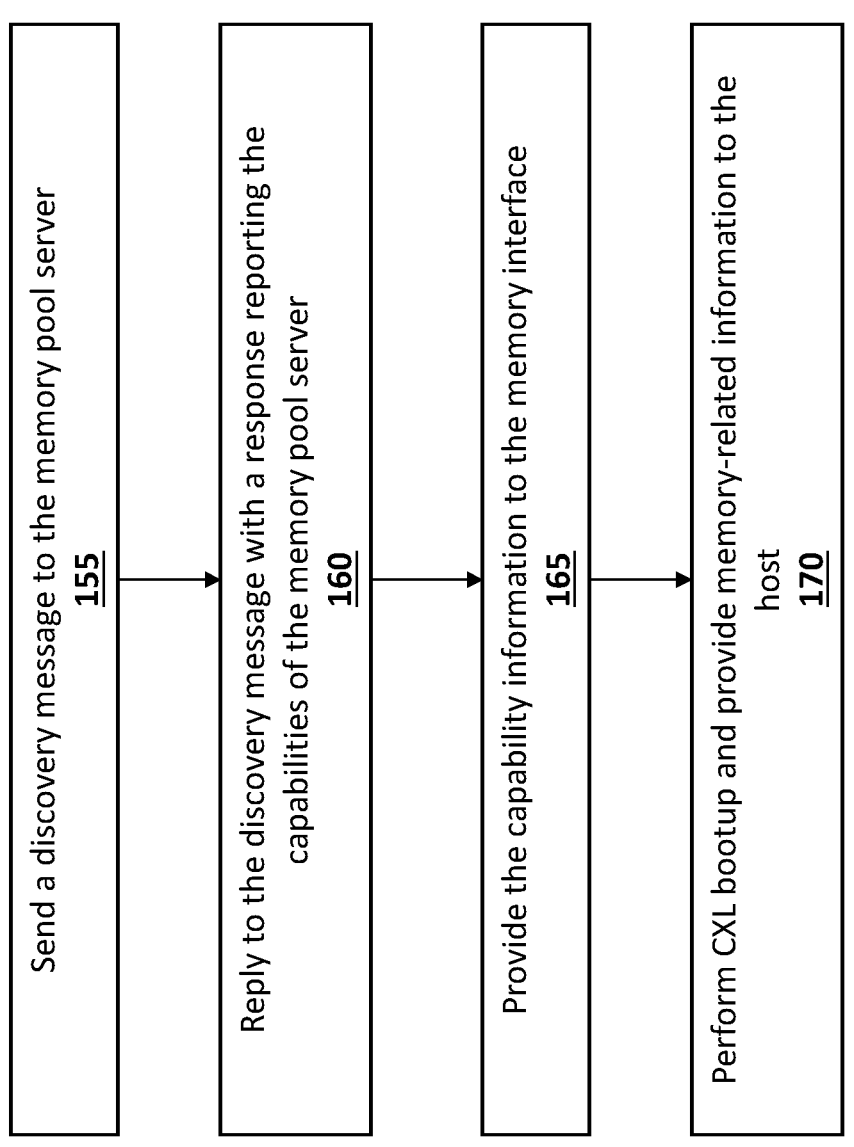
FIG. 1B is a flow chart of a startup procedure, according to an embodiment of the present disclosure.

FIG. 1B shows a method that may be employed at startup. In some embodiments, at startup, the RDMA network interface controller 135 in the interface circuit 120 sends, at 155, a discovery message to the memory pool server 125. The memory pool server 125 then replies, at 160, to the discovery message with a response reporting the capabilities of the memory pool server 125. The capabilities reported may include, for example, the capacity of the memory pool server 125, the bandwidth of the memory pool server 125, and the latency of the memory pool server 125. The RDMA network interface controller 135 may keep this capability information and provide, at 165, the capability information to the memory interface 130 for CXL bootup. The memory interface 130 may then perform, at 170, CXL bootup and provide memory-related information to the host 102 using coherent device attribute tables (CDATs) (which may be employed, under the CXL standard, to send memory information to host).

The connection between the interface circuit 120 and the memory pool server 125 may be a remote direct memory access connection, as illustrated. The remote direct memory access connection may include a cable 145 (e.g., an electrical cable (with a plurality of conductors) or an optical cable (including a plurality of fibers). The cable 145 may form a connection between a back-end interface 135 in the interface circuit 120 and another back-end interface 135 in the memory pool server 125. The interface between the RDMA network interface controllers 135 may be Ethernet or any other suitable computer cluster interconnect interface, e.g., InfiniBand or Fibre Channel.

The configuring of the back-end interface 135 of the interface circuit 120 may include using the Internet Protocol (IP) address of the memory pool server 125 (which may be part of the configuration of the back-end interface 135) to communicate with the memory pool server 125. The interface circuit 120 may negotiate for memory resources with the memory pool server 125 at boot up time, and establish a remote direct memory access connection with RDMA server to perform read or write operations.

The interface circuit 120 may, from the perspective of the host 102, be a CXL type 3 device. In operation, the remote direct memory access system may create one or more queue pairs (QPs), and register one or more memory regions (MRs). The queue pairs and memory regions may then be used to perform remote direct memory access read operations and remote direct memory access write operations, in response to load and store operations executed by the CPU 105 of the host 102.

For example, when the CPU 105 of the host 102 executes a store instruction for storing a first value in a first memory location at a first address, the first address being mapped to the interface circuit 120, the interface circuit 120 may receive the store instruction (as a result of the first address being mapped to the interface circuit 120), and, in response to the executing of the store instruction, the interface circuit 120 may send a store command to the memory pool server 125. The store command may be sent via remote direct memory access; for example, to store the first value in the memory pool 140 of the memory pool server 125, the interface circuit 120 may initiate a remote direct memory access write transfer, to store the first value in the memory pool 140.

As another example, if the CPU 105 of the host 102 executes a load instruction for loading, into a register of the CPU 105, a value in a second memory location at a second address, the second address being mapped to the interface circuit 120, the interface circuit 120 may receive the load instruction (as a result of the second address being mapped to the interface circuit 120), and, in response to the executing of the load instruction, the interface circuit 120 may send a read command to the memory pool server 125. The read command may be sent via remote direct memory access; for example, to read a value stored in the memory pool 140 of the memory pool server 125, the interface circuit 120 may initiate a remote direct memory access read transfer, to read the value from the memory pool 140.

CXL 2.0 may support a hot plug feature. As such, in embodiments in which the front-end interface 130 is a CXL interface, it may be possible to make a new connection to an interface circuit 120 while the host is operating, or to disconnect an interface circuit 120 while the host is operating, without interfering with the operation of the host. In some embodiments, the latency of the memory system 115 is sufficiently low (e.g., as a result of using a low latency protocol such as InfiniBand or RDMA) to enable the cache coherence preserving features of CXL.cache to be supported.

Figure 1C:
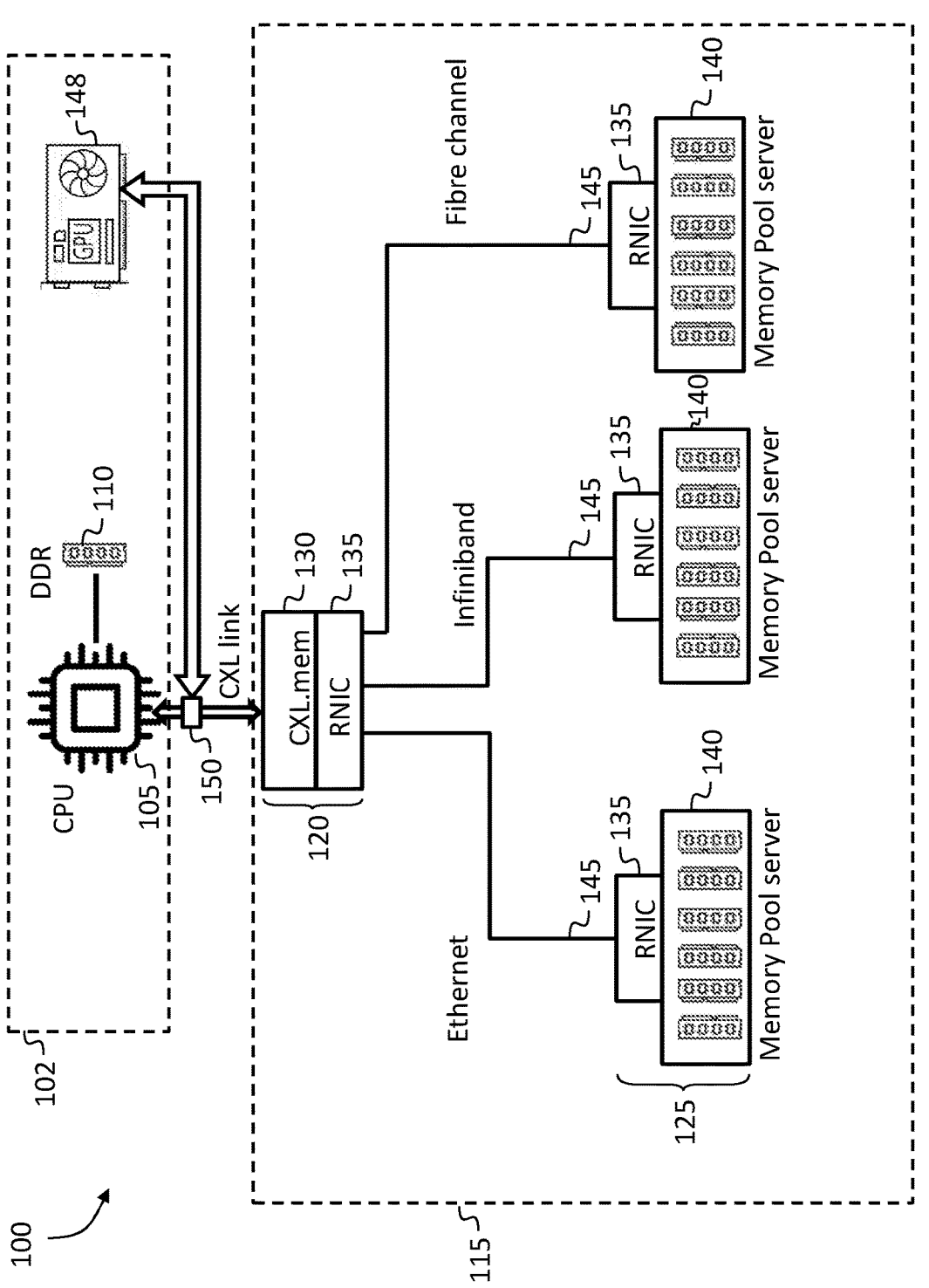
FIG. 1C is a block diagram of a single-host computing system including a graphics processing unit, according to an embodiment of the present disclosure.

Referring to FIG. 1C, in some embodiments, a graphics processing unit (GPU) 148 is connected to the CPU 105 and to the interface circuit 120. The connection may be made through a CXL switch 150, for example. In some embodiments, the graphics processing unit 148 is part of the host 102 as illustrated; in other embodiments, the graphics processing unit 148 may be the principal processing circuit of another host, or the graphics processing unit 148 may be a separate CXL device (e.g., a Type 2 CXL device) that is not part of the host 102 and that is, like the interface circuit 120, connected to the host through a CXL link. In some embodiments the graphics processing unit 148 is in a Type 2 CXL device.

Moreover, as illustrated in FIG. 1C, in some embodiments, a plurality of memory pool servers 125 are connected to the RDMA network interface controller 135 of the interface circuit 120. Each of the memory pool servers 125 may be connected to the interface circuit 120 via any suitable type of connection, e.g., Ethernet, Infiniband, or Fibre channel, as shown. The interface circuit 120 may include a single RDMA network interface controller 135 capable of supporting multiple respective connections to multiple memory pool servers 125, as shown, or the interface circuit 120 may include a plurality of RDMA network interface controllers 135, or one NIC with multiple physical interfaces, each connected to the memory interface 130 of the interface circuit 120 and each (i) connected to a respective one of the memory pool servers 125 and (ii) configured to support the protocol (e.g., Ethernet, Infiniband, or Fibre channel) used in the connection between the interface circuit 120 and the respective memory pool server 125. A connection made using Infiniband, for example, may have lower latency than a connection using Ethernet. Such a connection (e.g., a connection using Infiniband) may make it possible to meet the latency requirements of one or more of the three CXL protocols (cxl.io, cxl.mem, and cxl.cache).

Figure 1D:
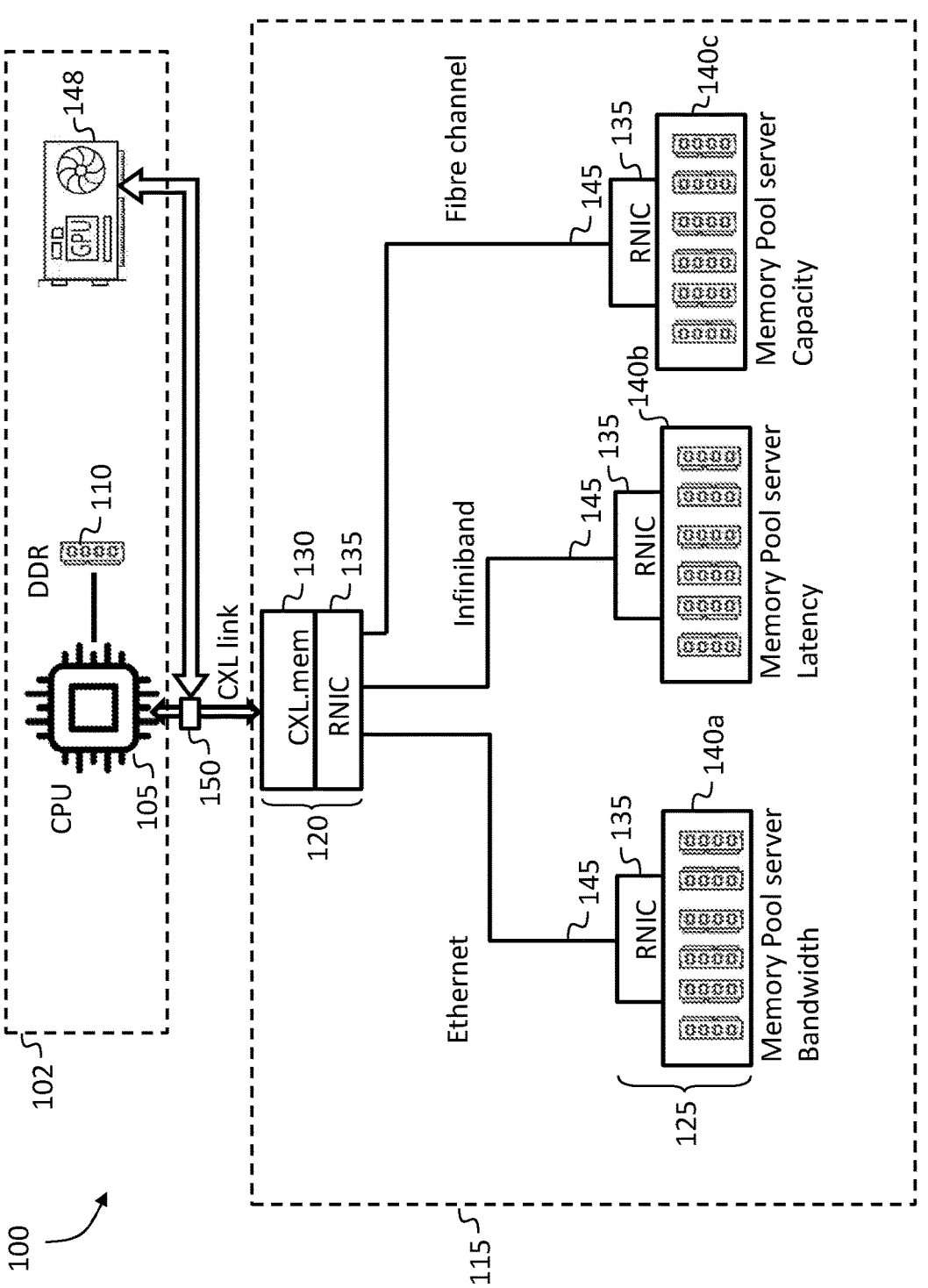
FIG. 1D is a block diagram of a single-host computing system including a plurality of different memory pool servers, according to an embodiment of the present disclosure.

Referring to FIG. 1D, in some embodiments, the memory pool servers 125 are constructed differently, e.g., one of the memory pool servers 125 may include a memory pool 140*a* optimized for high bandwidth, one of the memory pool servers 125 may include a memory pool 140*b* optimized for optimized for low latency, and one of the memory pool servers 125 may include a memory pool 140*c* optimized for high capacity. In some embodiments, the type of connection employed to connect the memory pool server 125 to the interface circuit 120 may be selected to provide a certain level of performance to the host 102. For example, an Infiniband connection, which may have relatively low latency, may be used to connect, to the interface circuit 120, a memory pool server 125 including a memory pool 140*b* optimized for low latency, so that the total latency experienced by the host 102 is reduced both (i) as a result of the type of memory pool 140 used and (ii) as a result of the type of connection used, to connect the memory pool server 125 to the interface circuit 120.

In some embodiments, an application running on the host 102 may require memory of different characteristics; for example, an application may require low latency memory for performance reasons. In some embodiments, such an application may be aware of the different performance characteristics of the different memory pool servers 125 connected to the host 102 through the interface circuit 120. The application may have access to this information as a result of the startup process (described above) which may result in this information being stored (e.g., by the operating system of the host 102) in the host. The application may then, when it requests memory from the operating system, request memory having performance characteristics that will result in the acceptable performance for the application.

Figure 2:
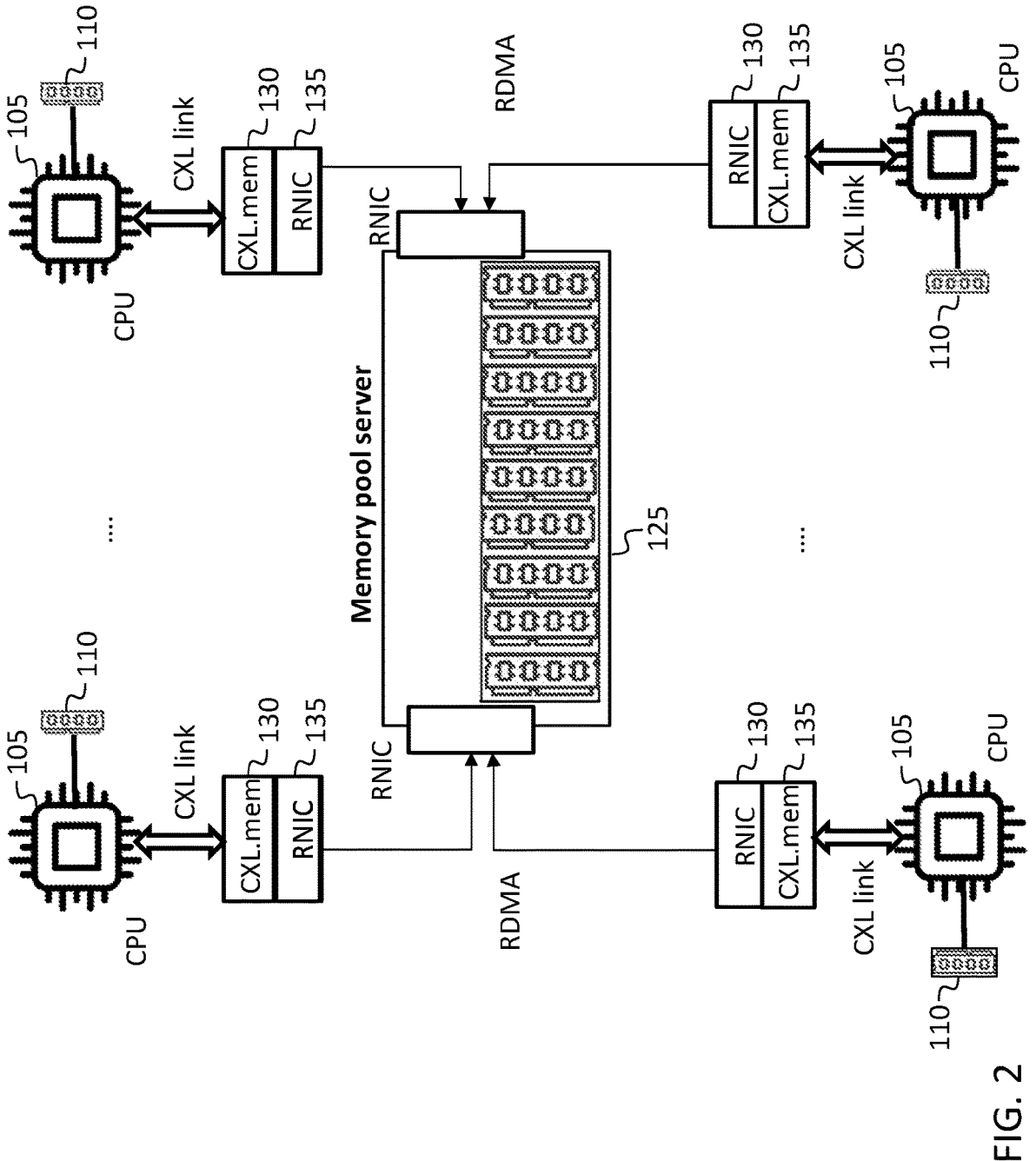
FIG. 2 is a block diagram of a multi-host computing system, according to an embodiment of the present disclosure.

Referring to FIG. 2, in some embodiments, a plurality of hosts may each be connected to a memory pool server 125 and share the memory resources of the memory pool server 125. As in the embodiment of FIG. 1A, each interface circuit 120 provides, to a respective host, a memory device with configured dynamic memory size, without the physical memory resource (e.g., the DRAM memory) being physically present in the interface circuit 120. A pool of disaggregated memory resources can be created, e.g., in one or more memory servers, and it may be placed at a remote location. A remote collection of memory servers may be referred to as a memory farm. Memory resources may be accessed using a low latency network protocol, such as remote direct memory access; in such embodiments, memory resources may be used efficiently, and the total cost of ownership (TCO) may be reduced.

Figure 3:
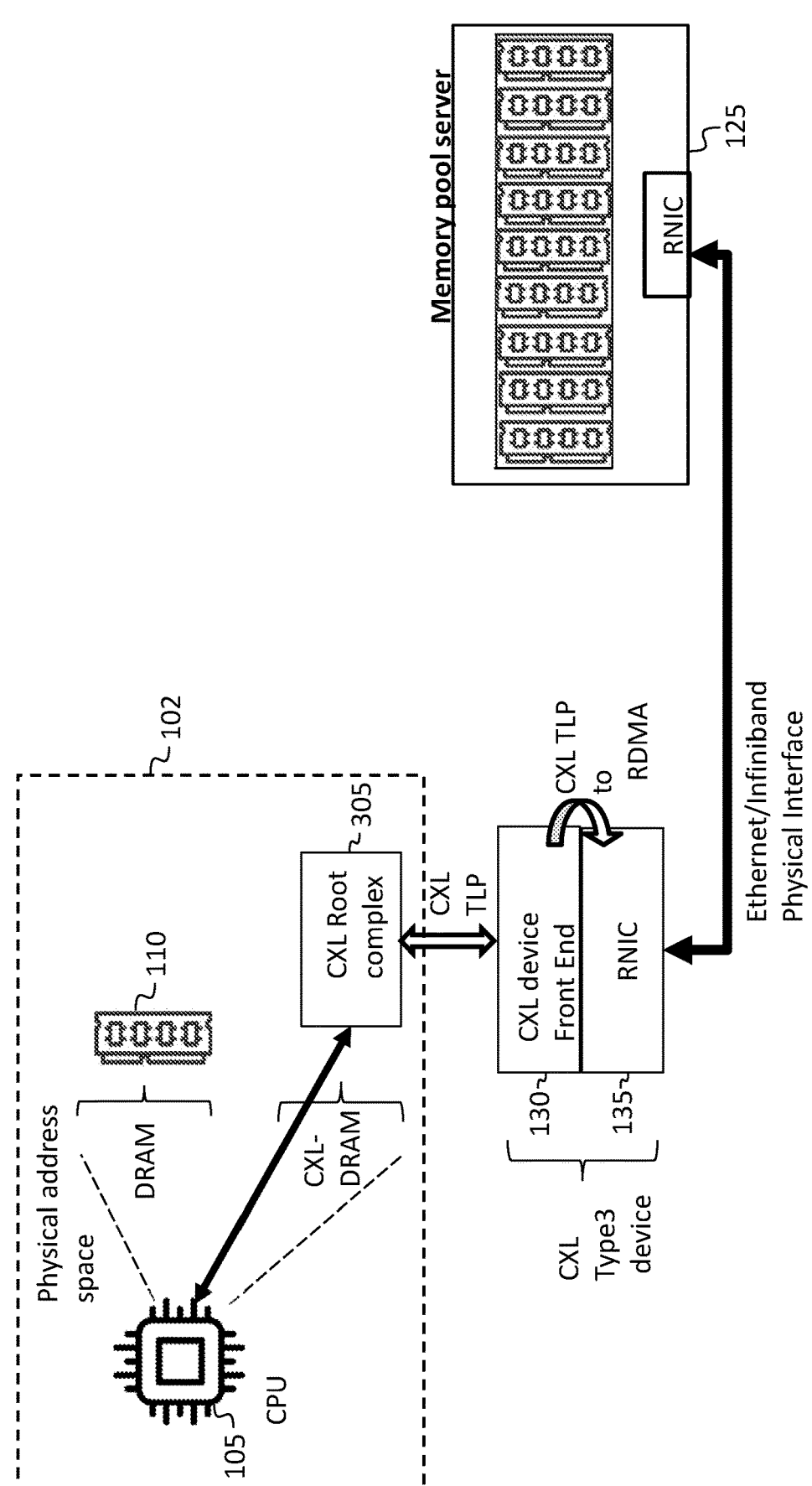
FIG. 3 is a operational block diagram of a single-host computing system, according to an embodiment of the present disclosure.

Referring to FIG. 3, as mentioned above, the interface circuit 120 may occupy a portion of the physical address space of the CPU 105. The host 102 may further include (in addition to the CPU 105 and the local memory 110) a CXL root complex 305, which may form the interface, on the host side, to the CXL link of FIG. 1A. In some embodiments, in operation, the host writes into physical address space mapped CXL-DRAM, the request is sent to the CXL root complex 305 (through the address bus and the data bus of the CPU 105), the CXL root complex 305 generates a Transaction Layer Packet (TLP) and sends it to the interface circuit 120, and the interface circuit 120 converts the Transaction Layer Packet to remote direct memory access and sends it over the computer cluster interconnect interface.

Figure 4:
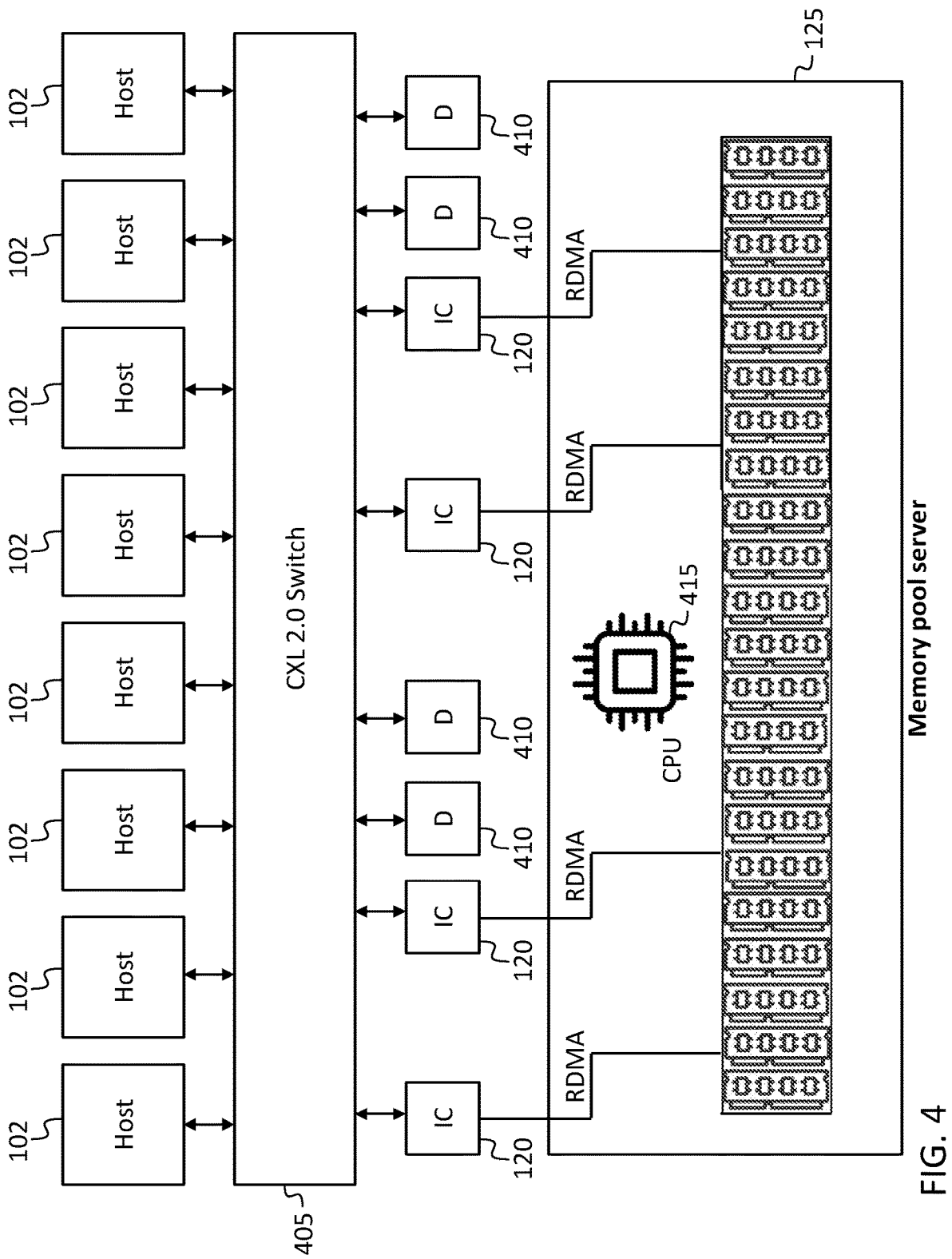
FIG. 4 is a block diagram of a multi-host computing system with a switch, according to an embodiment of the present disclosure.

FIG. 4 shows an embodiment including a CXL switch 405. Each of a plurality of hosts 102 is connected to the CXL switch 405 (which may be or include, e.g., a CXL 2.0 switch) which is connected to one or more interface circuits 120 (each labeled "IC" in FIG. 4) and to zero or more other CXL devices 410 (each labeled "D" in FIG. 4). The interface circuits 120 may be connected through remote direct memory access connections to a single shared memory pool server 125 (as shown) or they may be connected to a plurality of memory pool servers 125 (e.g., each interface circuit 120 may be connected to a respective memory pool server 125).

Figure 5:
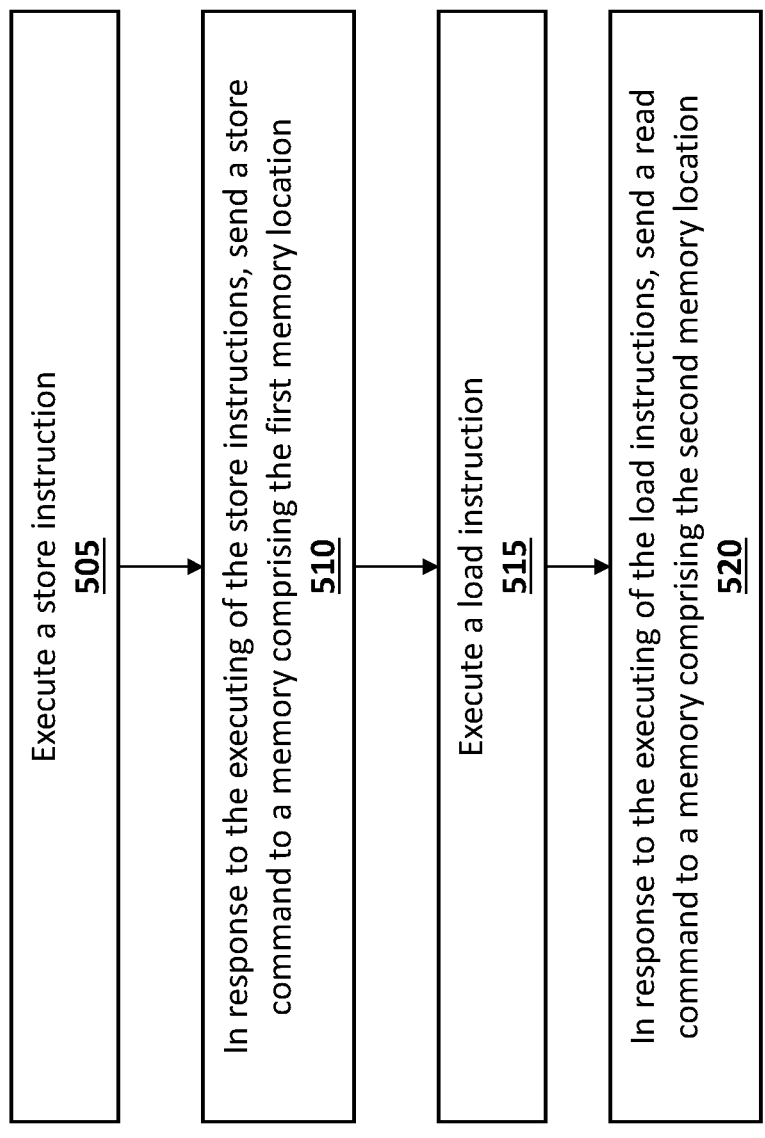
FIG. 5 is a flow chart of a method, according to an embodiment of the present disclosure.

FIG. 5 is a flowchart of a method, in some embodiments. The method includes, at 505, executing, by a central processing unit, a store instruction for storing a first value in a first memory location at a first address, and, at 510, in response to the executing of the store instruction, sending a store command, by an interface circuit, to a memory comprising the first memory location, the store command being a command to store the first value in the first memory location. The method may further include at 515, executing, by a central processing unit, a load instruction for reading a second value, which may be stored in a second memory location at a second address, and, at 520, in response to the executing of the load instruction, sending a read command, by the interface circuit, to a memory comprising the second memory location, the read command being a command to read the second value from the second memory location.

As used herein, a computer cluster interconnect interface is any interface suitable for interconnecting computers, such as InfiniBand, Ethernet, or Fibre Channel.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments include features listed in the following numbered statements.

1. A system, comprising:
an interface circuit having:
    a first interface, configured to be connected to a processing circuit; and
    a second interface, configured to be connected to memory, the first interface comprising a cache coherent interface, and the second interface being different from the first interface.

2. The system of statement 1, further comprising a memory server connected to the second interface.

3. The system of statement 1 or statement 2, wherein the second interface comprises a remote direct memory access interface.

4. The system of any one of the preceding statements, wherein the second interface comprises a computer cluster interconnect interface.

5. The system of statement 4, wherein the computer cluster interconnect interface comprises an Ethernet interface.

6. The system of any one of statements 2 to 5, wherein the memory server is connected to the second interface by a cable having a length greater than 6 feet.

7. The system of any one of the preceding statements, wherein the cache coherent interface comprises a Compute Express Link (CXL) interface.

8. The system of any one of the preceding statements, wherein the first interface is configured to:
    send data to the processing circuit in response to a load instruction executed by the processing circuit; and
    receive data from the processing circuit in response to a store instruction executed by the processing circuit.

9. The system of any one of the preceding statements, further comprising a Compute Express Link (CXL) root complex connected between the processing circuit and the first interface.

10. A system, comprising:
an interface circuit having:
    a first interface, configured to be connected to a processing circuit; and
    a second interface, configured to be connected to memory, the first interface comprising a Compute Express Link (CXL) interface, and the second interface being different from the first interface.

11. The system of statement 10, further comprising a memory server connected to the second interface.

12. The system of statement 10 or statement 11, wherein the second interface comprises a remote direct memory access interface.

13. The system of any one of statements 10 to 12, wherein the second interface comprises a computer cluster interconnect interface.

14. The system of any one of statements 10 to 13, wherein the computer cluster interconnect interface comprises an Ethernet interface.

15. The system of any one of statements 10 to 14, wherein the memory server is connected to the second interface by a cable having a length greater than 6 feet.

16. The system of any one of statements 10 to 15, wherein the CXL interface comprises a cache coherent interface.

17. The system of any one of statements 10 to 16, wherein the first interface is configured to:

send data to the processing circuit in response to a load instruction executed by the processing circuit; and receive data from the processing circuit in response to a store instruction executed by the processing circuit.

18. The system of any one of statements 10 to 17, further comprising a CXL root complex connected between the processing circuit and the first interface.

19. A method, comprising:

executing, by a central processing unit, a store instruction for storing a first value in a first memory location at a first address, in response to the executing of the store instruction, sending a store command, by an interface circuit, to a memory comprising the first memory location, the store command being a command to store the first value in the first memory location, wherein the interface circuit has:

a first interface, connected to the central processing unit; and a second interface, connected to the memory, the first interface comprising a Compute Express Link (CXL) interface, and the second interface being different from the first interface.

20. The method of statement 19, further comprising:

executing, by the central processing unit, a load instruction for loading, into a register of the central processing unit, a value in a second memory location at a second address, in response to the executing of the load instruction, sending a read command, by the interface circuit, to the memory, the read command being a command to read the value in the second memory location.

Although exemplary embodiments of an interface for remote memory have been specifically described and illustrated herein, many modifications and variations will be apparent to those skilled in the art. Accordingly, it is to be understood that an interface for remote memory constructed according to principles of this disclosure may be embodied other than as specifically described herein. The invention is also defined in the following claims, and equivalents thereof.

What is claimed is:

1. A system, comprising:

an interface circuit having:

a first interface, configured to be connected to a processing circuit; and a second interface, configured to be connected to memory, the memory comprising:

a first memory server comprising first performance characteristics comprising at least one of a first capacity, a first latency, or a first bandwidth; and a second memory server comprising second performance characteristics comprising at least one of a second capacity, a second latency, or a second bandwidth, the first capacity being greater than the second capacity, the first latency being less than the second latency, or the first bandwidth being greater than the second bandwidth the first interface comprising a cache coherent interface, the second interface being different from the first interface, and the interface circuit being configured to send, via the first interface, information for identifying the first memory server as having the first capacity greater than the second capacity, the first latency less than the second latency, or the first bandwidth greater than the second bandwidth.

2. The system of claim 1, further comprising the first memory server and the second memory server connected to the second interface.

3. The system of claim 2, wherein the second interface comprises a remote direct memory access interface.

4. The system of claim 2, wherein the second interface comprises a computer cluster interconnect interface.

5. The system of claim 4, wherein the computer cluster interconnect interface comprises an Ethernet interface.

6. The system of claim 2, wherein the first memory server or the second memory server is connected to the second interface by a cable having a length greater than 6 feet.

7. The system of claim 1, wherein the cache coherent interface comprises a Compute Express Link (CXL) interface.

8. The system of claim 1, wherein the first interface is configured to:

send data to the processing circuit in response to a load instruction executed by the processing circuit; and receive data from the processing circuit in response to a store instruction executed by the processing circuit.

9. The system of claim 1, further comprising a Compute Express Link (CXL) root complex connected between the processing circuit and the first interface.

10. A system, comprising:

an interface circuit having:

a first interface, configured to be connected to a processing circuit; and a second interface, configured to be connected to memory, the memory comprising:

a first memory server comprising first performance characteristics comprising at least one of a first capacity, a first latency, or a first bandwidth; and a second memory server comprising second performance characteristics comprising at least one of a second capacity, a second latency, or a second bandwidth, the first capacity being greater than the second capacity, the first latency being less than the second latency, or the first bandwidth being greater than the second bandwidth the first interface comprising a Compute Express Link (CXL) interface, the second interface being different from the first interface, and the interface circuit being configured to send, via the first interface, information for identifying the first memory server as having the first capacity greater than the second capacity, the first latency less than the second latency, or the first bandwidth greater than the second bandwidth.

11. The system of claim 10, further comprising the first memory server and the second memory server connected to the second interface.

12. The system of claim 11, wherein the second interface comprises a remote direct memory access interface.

13. The system of claim 11, wherein the second interface comprises a computer cluster interconnect interface.

14. The system of claim 13, wherein the computer cluster interconnect interface comprises an Ethernet interface.

15. The system of claim 13, wherein the first memory server or the second memory server is connected to the second interface by a cable having a length greater than 6 feet.

16. The system of claim 13, wherein the CXL interface comprises a cache coherent interface.

17. The system of claim 10, wherein the first interface is configured to:

send data to the processing circuit in response to a load instruction executed by the processing circuit; and receive data from the processing circuit in response to a store instruction executed by the processing circuit.

18. The system of claim 10, further comprising a CXL root complex connected between the processing circuit and the first interface.

19. A method, comprising:

executing, by a central processing unit, a store instruction for storing a first value in a first memory location at a first address, in response to the executing of the store instruction, sending a store command, by an interface circuit, to a memory comprising the first memory location, the store command being a command to store the first value in the first memory location, wherein the interface circuit has:

a first interface, connected to the central processing unit; and a second interface, connected to the memory, the memory further comprising:

a first memory server comprising first performance characteristics comprising at least one of a first capacity, a first latency, or a first bandwidth; and a second memory server comprising second performance characteristics comprising at least one of a second capacity, a second latency, or a second bandwidth, the first capacity being greater than the second capacity, the first latency being less than the second latency, or the first bandwidth being greater than the second bandwidth, the first memory location being associated with the first memory server or the second memory server, the first interface comprising a Compute Express Link (CXL) interface, the interface circuit being configured to send information regarding a capacity, a latency, or a bandwidth of the memory via the first interface, and the second interface being different from the first interface.

20. The method of claim 19, further comprising:

executing, by the central processing unit, a load instruction for loading, into a register of the central processing unit, a value in a second memory location at a second address, in response to the executing of the load instruction, sending a read command, by the interface circuit, to the memory, the read command being a command to read the value in the second memory location, the second memory location being associated with the first memory server or the second memory server.

\* \* \* \* \*